US008192897B2

(12) United States Patent
Park et al.

(10) Patent No.: US 8,192,897 B2
(45) Date of Patent: Jun. 5, 2012

(54) METHOD FOR PREPARATION OF TRANSITION METAL ELECTROPLATED POROUS CARBON NANOFIBER COMPOSITE FOR HYDROGEN STORAGE

(75) Inventors: Soo Jin Park, Daejeon (KR); Byung Joo Kim, Daejeon (KR); Young Seak Lee, Daejeon (KR)

(73) Assignee: INHA-Industry Partnership Institute, Incheon (KR)

( * ) Notice: Subject to any disclaimer, the term of this patent is extended or adjusted under 35 U.S.C. 154(b) by 906 days.

(21) Appl. No.: 12/058,861

(22) Filed: Mar. 31, 2008

(65) Prior Publication Data

US 2009/0181266 A1    Jul. 16, 2009

(30) Foreign Application Priority Data

Jan. 16, 2008    (KR) ........................ 10-2008-0005045

(51) Int. Cl.
| | |
|---|---|
| *C25B 9/00* | (2006.01) |
| *C25C 7/00* | (2006.01) |
| *C25D 17/00* | (2006.01) |
| *C25D 5/00* | (2006.01) |
| *C25D 5/02* | (2006.01) |
| *C25D 5/54* | (2006.01) |
| *C25D 3/56* | (2006.01) |
| *G01N 27/26* | (2006.01) |
| *H01L 21/288* | (2006.01) |
| *H01L 21/445* | (2006.01) |
| *H01M 4/02* | (2006.01) |
| *H01M 4/36* | (2006.01) |
| *B32B 9/00* | (2006.01) |
| *D02G 3/00* | (2006.01) |

(52) U.S. Cl. ........ 429/530; 204/242; 204/434; 205/112; 205/122; 205/159; 205/238; 428/367; 429/524; 429/526; 429/527

(58) Field of Classification Search ............... 429/218.2, 429/524, 526, 527, 530; 204/242, 434; 205/112, 205/122, 159, 238; 428/367
See application file for complete search history.

(56) References Cited

U.S. PATENT DOCUMENTS

2007/0251827 A1* 11/2007 Park et al. .................... 205/238
(Continued)

FOREIGN PATENT DOCUMENTS

JP    2002-126506 A    5/2002
(Continued)

OTHER PUBLICATIONS

Kim et al., Machine translation of KR 744832 B1, Aug. 2007.*
(Continued)

*Primary Examiner* — Basia Ridley
*Assistant Examiner* — Sean P Cullen
(74) *Attorney, Agent, or Firm* — Frommer Lawrence & Haug LLP; Ronald R Santucci

(57) ABSTRACT

There is provided a method for preparation of a transition metal electroplated porous carbon nanofiber composite for hydrogen storage. Specifically, the preparation method of a transition metal electroplated porous carbon nanofiber composite for hydrogen storage according to the present invention comprises electroplating a transition metal with a controlled particle diameter and a surface dispersion ratio on a porous carbon nanofiber with specific surface area from 500 to 3000 $m^2/g$, pore volume from 0.1 to 2.0 cc/g and diameter from 10 to 500 nm. With increased hydrogen storage capacity, the transition metal electroplated porous carbon nanofiber composite provided by the present invention can be utilized as hydrogen storage medium of active material for electrodes of electrochemical devices, such as fuel cell, secondary cell and supercapcitor.

4 Claims, 1 Drawing Sheet

U.S. PATENT DOCUMENTS

2009/0194736 A1 * 8/2009 Lee et al. .................. 252/182.33

FOREIGN PATENT DOCUMENTS

| JP | 2003-165701 A | | 6/2003 |
| KR | 10-2006-0108170 A | | 10/2006 |
| KR | 2006108170 A | * | 10/2006 |
| KR | 10-0744832 B | | 7/2007 |
| KR | 10-2007-0106218 A | | 11/2008 |
| WO | WO 2007047630 A2 | * | 4/2007 |

OTHER PUBLICATIONS

Zielinski, M. et al.: "Hydrogen storage in nickel catalysts supported on activated carbon", *International Journal of Hydrogen Energy*, 32 (2007), pp. 1024-1032.

* cited by examiner

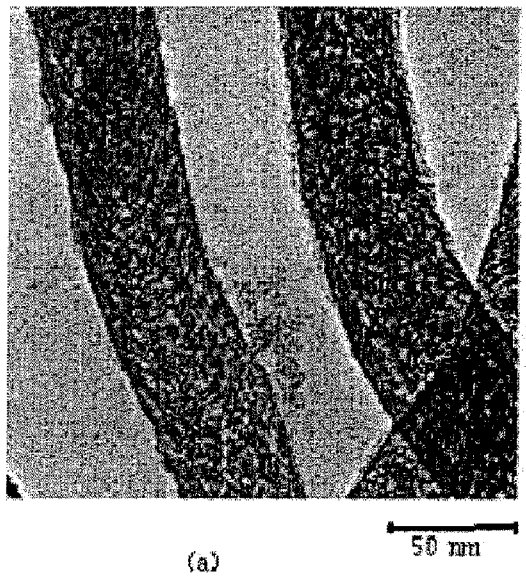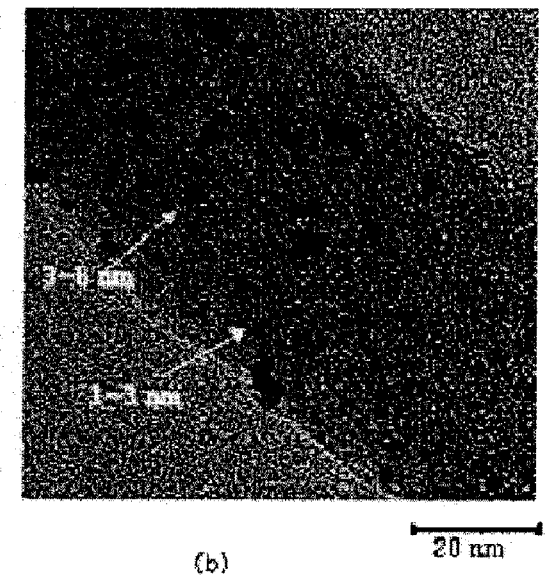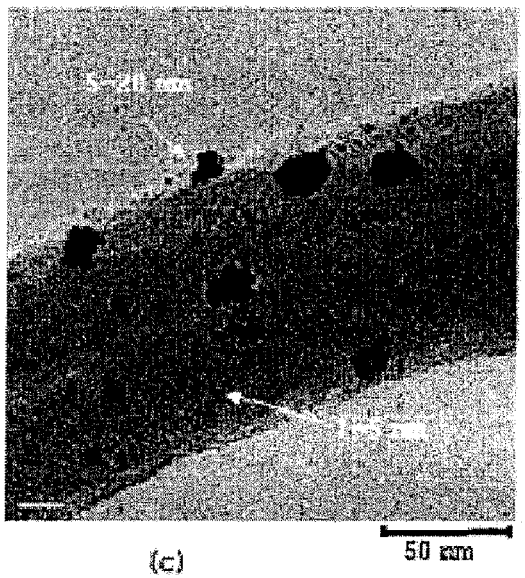

METHOD FOR PREPARATION OF TRANSITION METAL ELECTROPLATED POROUS CARBON NANOFIBER COMPOSITE FOR HYDROGEN STORAGE

CROSS-REFERENCE TO RELATED APPLICATION

This application claims under 35 U.S.C. §119(a) the benefit of Korean Patent Application No. 10-2008-0005045 filed Jan. 16, 2008, the entire contents of which are incorporated herein by reference.

BACKGROUND (a) Technical Field

The present invention relates to a method for preparation of a transition metal electroplated porous carbon nanofiber composite for hydrogen storage with increased hydrogen storage capacity comprising electroplating a transition metal with controlled particle diameter and surface dispersion on porous carbon nanofiber having predetermine specific surface area, pore volume and diameter.

(b) Background Art

With the development of industries, the consumption of fossil fuels including oil, coal, natural gas, etc. accounts for 90% or more of the total energy consumption. However, fossil fuels cannot be recycled after use, and are expected to be depleted in 50 to 100 years. Besides, various pollutants generated during the burning of the fossil fuels have been threatening the mankind with severe environmental problems such as global warming, destruction of the ozone layer and acid rain. Accordingly, the development of alternative energy sources, which are clean and safe and are not depleted, is required. Fundamentally, there is an urgent need for a new energy system not relying on fossil fuels.

In this regard, natural energy sources such as solar heat, subterranean heat, wind force, ocean energy, etc., and hydrogen energy using water are viewed as promising alternative energy sources. A fuel cell system using hydrogen is without the problem of depletion, because hydrogen can be produced unlimitedly from water. Further, there is no generation of environmental pollutants, e.g., carbon dioxide ($CO_2$), at all. Such a fuel cell system requires a hydrogen storage medium. Recently, researches have been actively carried out focusing on carbon materials for use as a hydrogen storage medium.

Although consisting of single elements, carbon materials are superior in chemical stability, electrical and thermal conductivity, strength, elasticity, biological affinity, etc., because of various bonding types. Further, they are advantageous over conventional hydrogen storage media such as high-pressure hydrogen storage media, liquefied hydrogen, silica, metal-organic frameworks (MOFs) and metal hydrides, because they are safer, lighter, less expensive, more stable and environment-friendly because they can be recycled. In addition, through a series of activation processes, the carbon materials can be transformed into ultra-porous materials with exceptionally high specific surface area incomparable with other materials. Such porous structures have been utilized for adsorption of hydrogen or other gases. Through adequate control of the pore structure and the surface characteristics, the carbon materials can be transformed into highly functional hydrogen storage media.

Until now, the hydrogen storage mechanism of carbon nanotube has not been elucidated clearly. And, the carbon nanotube is disadvantageous in that it has limited hydrogen storage capacity at room temperature. Ye et al. [*Appl. Phys. Lett.* 74 (1999) 2307] have reported that up to 8 weight % of hydrogen storage was attained using a single-walled carbon nanotube. But, this was a result obtained under ultra-low temperature (80 K) and high pressure (40 bar). At present, no case is reported in which a hydrogen storage capacity of 1 weight % or better has been attained at room temperature and normal pressure.

Hydrogen storage using carbon materials is advantageous over high-pressure hydrogen storage or liquefied hydrogen storage, in safety and cost. Further, it is semi-permeable because the associated reaction is reversible. However, the porous carbon itself has insufficient affinity for hydrogen molecules, and the hydrogen storage capacity at room temperature is not so great because of low adsorption energy. Accordingly, there have been attempts to greatly improve hydrogen storage capacity by modifying the existing carbon materials. However, in the conventional methods, only metal salts have been added to various carbon materials.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

An object of the present invention is to provide a method for preparation of a transition metal electroplated porous carbon nanofiber composite for hydrogen storage with high capacity using a carbon nanofiber with large specific surface area. Another object of the present invention is to provide a method for preparation of a transition metal electroplated porous carbon nanofiber composite for hydrogen storage with high capacity and optimized content, dispersion ratio and specific surface area. Further another object of the present invention is to provide an active material for an electrode of an electrochemical device comprising a transition metal electroplated porous carbon nanofiber composite for hydrogen storage prepared by the above-described method.

In one aspect, the present invention provides a method for preparation of a transition metal electroplated porous carbon nanofiber composite comprising: providing 1) an anode comprising a transition metal plate and 2) a cathode comprising a porous carbon nanofiber with specific surface area from 500 to 3000 $m^2/g$, pore volume from 0.1 to 2.0 cc/g and diameter from 10 to 500 nm supported on a conductive support in an electroplating bath, and applying an electrical current of 0.01 to 5.0 $A/m^2$ between the anode and the cathode for 15 to 300 seconds.

BRIEF DESCRIPTION OF THE DRAWINGS

FIG. 1 shows TEM images of a transition metal electroplated porous carbon nanofiber composite prepared according to the present invention. (a) is the porous carbon nanofiber before electroplating of the transition metal, (b) is the transition metal electroplated porous carbon nanofiber composite prepared in Example 2, and (c) is the transition metal electroplated porous carbon nanofiber composite prepared in Example 4.

DETAILED DESCRIPTION

In the present invention, a porous carbon nanofiber with high specific surface area is used as hydrogen storage medium, and a transition metal is electroplated on the surface thereof.

Korean Patent No. 10-0572995 discloses a nickel (Ni) electroplated carbon fiber. But, this invention is entirely different from the present invention in purpose, constitution, effect and use.

In the nickel electroplated carbon fiber according to Korean Patent No. 10-0572995, nickel is electroplated on carbon fiber using an electrolyte solution comprising nickel sulfate ($NiSO_4$), nickel chloride ($NiCl_2$) or boric acid ($H_3BO_3$) as main component. The nickel electroplated carbon fiber is for use as ultra-light material, with reduced damage to the carbon fiber and improved interfacial adhesion to matrix resin provided by oxygen radicals introduced on the surface of the carbon fiber.

In contrast, in the transition metal electroplated porous carbon nanofiber composite according to the present invention, a carbon nanofiber with specific surface area from 500 to 3000 $m^2/g$, pore volume from 0.1 to 2.0 cc/g and diameter from 10 to 500 nm is used. Korean Patent No. 10-0572995 aims at forming a uniform nickel film over the entire surface of carbon fiber in order to improve reinforcing properties thereof, and no consideration was required for metal particles and dispersion thereof. However, the transition metal electroplated porous carbon nanofiber composite according to the present invention is a kind of catalytic material using a porous carbon nanofiber with specific surface area, pore volume and diameter as support. Hence, metals need to be monodispersed as much as possible, with high dispersion ratio over the entire support. Also, the active surface area needs to be maximized. When a nickel film is formed according to the method presented by Korean Patent No. 10-0572995, a high hydrogen storage capacity cannot be attained because the surface area for the reaction with hydrogen is very limited.

Further, the present invention enables the introduction of metals to a porous carbon material with uniform and high specific surface area. Thus, when applied for electrodes of electrochemical devices, e.g., secondary cells, fuel cells, supercapcitors, etc., the nanodispersed porous carbon nanofiber will be very useful. Still, the fundamental use of metal/porous carbon nanofiber presented by the present invention is for hydrogen storage.

With such a big difference in purpose, constitution, effect and use, those skilled in the art will appreciate that the two inventions are totally different ones.

Reference will now be made in detail to the preferred embodiments of the present invention.

The present invention is characterized by preparing a transition metal electroplated porous carbon nanofiber composite with high hydrogen storage capacity by electroplating a transition metal on the above-described porous carbon nanofiber. The electroplating is performed by providing an electrolyte solution, an anode and a cathode in an electroplating bath, and then applying electrical current. The electrolyte solution is not particularly limited, but may be one commonly used in the art. For instance, metal sulfide, metal chloride or metal nitride, which may be easily ionized in aqueous solution, may be used.

As the anode for electroplating, a metal plate comprising a transition metal is used. The transition metal is introduced to induce partial polarization of hydrogen on the surface of the porous carbon fiber, utilizing its property as good electron acceptor, and, through electroplating of transition metal at low electrical current density, it is expected that the surface active area may be maximized and hydrogen storage capacity may be improved. To this end, the transition metal may be at least one selected from platinum (Pt), copper (Cu), nickel (Ni), silver (Ag), chromium (Cr), aluminum (Al), iron (Fe), cobalt (Co), ruthenium (Ru) and zinc (Zn).

And, as the anode for electroplating, a conductive support on which a porous carbon nanofiber is supported is used. The porous carbon nanofiber used in the present invention has specific surface area from 500 to 3000 $m^2/g$, pore volume from 0.1 to 2.0 cc/g and diameter from 10 to 500 nm. The specific surface area of the carbon nanofiber plays the most important role in improving hydrogen storage capacity. When the specific surface area is smaller than 500 $m^2/g$, hydrogen storage capacity may be low due to insufficient contact area with hydrogen. Meanwhile, when the specific surface area is larger than 3000 $m^2/g$, hydrogen storage and/or release may be hindered due to complicated pore structure. The pore volume of the carbon nanofiber is related with the actual space in which hydrogen can be stored. When the pore volume is smaller than 0.1 cc/g, hydrogen storage capacity may be low. Meanwhile, when the pore volume is larger than 2.0 cc/g, actual hydrogen storage capacity decreases despite large space, since the fraction of pores decreases. Meanwhile, the diameter of the carbon nanofiber is closely related with the depth of pores. When the diameter is smaller than 10 nm, it becomes difficult to provide pores. Meanwhile when the diameter is larger than 500 nm, the pores may be buried inside instead of being exposed outward.

Such a porous carbon nanofiber may be prepared by the method commonly used in the art, without particular limitation. Particularly, a porous carbon nanofiber prepared by high-temperature vapor oxidation may be used. More specifically, the porous carbon nanofiber may be prepared by chemical vapor deposition (CVD) or electrospinning, and activated at 600 to 1500° C. under carbon dioxide and water vapor atmosphere for about 30 minutes or more. The inside of the porous carbon nanofiber has a graphite structure selected from plane, cup and fishbone structures. The porous carbon nanofiber may be present in the form of granules, powders or woven or nonwoven fabrics.

The electroplating is performed by applying an electrical current of 0.01 to 5.0 $A/m^2$ for 15 to 300 seconds between the anode and the cathode immersed in the electrolyte solution. When the electrical current density is below 0.01 $A/m^2$, the amount of transition metal formed on the surface of the carbon nanofiber is small, because of low concentration of electrons emitted from the cathode and transition metal ions released from the anode. And, when the electrical current density exceeds 5.0 $A/m^2$, excessive transition metal ions may for pitting on the surface of the carbon nanofiber, thereby reducing activity at the interface. Hence, the aforesaid range is preferred. When the electrical current is applied for a duration of time which is shorter than 15 seconds, the amount of transition metal formed on the surface of the carbon nanofiber is small, because of low concentration of electrons emitted from the cathode and transition metal ions released from the anode. Meanwhile, when the electrical current is applied for a time duration longer than 300 seconds, excessive transition metal ions may for pitting on the surface of the carbon nanofiber, thereby reducing activity at the interface. Hence, the aforesaid range is preferred.

In the transition metal electroplated porous carbon nanofiber composite for hydrogen storage according to the present invention, the transition metal is preferably electroplated in an amount of from 0.01 to 30 weight %, based on the total weight of the transition metal supported porous carbon nanofiber. More preferably, it may be electroplated in an amount of from 0.1 to 10 weight %. When the electroplating amount is too much, aggregation of metal particles may occur, thereby resulting in blocking of pores and decrease of specific surface area. The transition metal electroplated in the porous carbon nanofiber composite has a particle size from 1.5 to 20 nm, and a metal dispersion ratio of from 0.01 to 50 area %. As used herein, the metal dispersion ratio refers to the dispersion ratio of the transition metal introduced to the transition metal electroplated porous carbon nanofiber composite. It is calculated by dividing the active area determined by chemisorption with the external area of the porous carbon nanofiber composite. More preferably, the metal dispersion ratio is in the range of from 0.1 to 10 area %.

Such prepared transition metal electroplated porous carbon nanofiber composite for hydrogen storage contains 0.01 to 3 weight % of hydrogen. Considering that there has been no case of a hydrogen storage capacity as much as 1 weight %, the transition metal electroplated porous carbon nanofiber composite for hydrogen storage according to the present invention can be useful not only as hydrogen storage medium, but also as active material for electrodes of electrochemical devices such as fuel cells, secondary cells and supercapcitors.

EXAMPLES

The following examples further illustrate the present invention but they should not be construed as limiting the scope of the present invention.

Preparation Example

Preparation of Porous Carbon Nanofiber

A porous carbon nanofiber was prepared by chemical vapor oxidation at 1000° C. or above using a commercially available carbon nanofiber which had been manufactured by chemical vapor deposition (CVD). The porous carbon nanofiber had a length of about 100 μm, and diameter, pore volume and specific surface area are given in Table 1 below.

Examples 1 to 16 and Comparative Examples 1 to 6

A transition metal was introduced to the porous carbon nanofiber by electroplating. A mixture of metal sulfide and metal chloride was used as electrolyte solution. A metal plate comprising the corresponding transition metal (see Table 1) and a porous carbon nanofiber treated with a conductive material were used as anode and cathode, respectively.

With regard to the electroplating, electrical current density and electroplating time are also given in Table 1.

Thus prepared transition metal electroplated porous carbon nanofiber composite was thoroughly washed with secondary distilled water, and dried in a dryer set to 120° C. for 24 hours.

TABLE 1

| | | Porous carbon nanofiber | | | Electroplating | |
|---|---|---|---|---|---|---|
| | Transition metal | Specific surface area (m²/g) | Pore volume (cc/g) | Diameter (nm) | Electrical current density (A/m²) | Time (sec) |
| Ex. 1 | Pt | 1725 | 1.85 | 55 | 0.05 | 60 |
| Ex. 2 | | 1510 | 1.72 | 55 | 0.1 | 60 |
| Ex. 3 | | 1420 | 1.63 | 55 | 0.5 | 60 |
| Ex. 4 | | 1115 | 1.33 | 55 | 1.0 | 60 |
| Ex. 5 | Cu | 1630 | 1.79 | 55 | 0.1 | 30 |
| Ex. 6 | | 1320 | 1.54 | 55 | 0.5 | 30 |
| Ex. 7 | | 1215 | 1.42 | 55 | 2.5 | 15 |
| Ex. 8 | | 980 | 1.15 | 55 | 5.0 | 20 |
| Ex. 9 | Ni | 1825 | 1.91 | 55 | 0.05 | 60 |
| Ex. 10 | | 1620 | 1.78 | 55 | 0.1 | 60 |
| Ex. 11 | | 1485 | 1.70 | 55 | 0.5 | 60 |
| Ex. 12 | | 1360 | 1.58 | 55 | 3.0 | 60 |

TABLE 1-continued

| | | Porous carbon nanofiber | | | Electroplating | |
|---|---|---|---|---|---|---|
| | Transition metal | Specific surface area (m²/g) | Pore volume (cc/g) | Diameter (nm) | Electrical current density (A/m²) | Time (sec) |
| Ex. 13 | Ag | 1550 | 1.75 | 55 | 0.05 | 30 |
| Ex. 14 | | 1315 | 1.53 | 55 | 0.01 | 60 |
| Ex. 15 | | 1025 | 1.21 | 55 | 5.0 | 10 |
| Ex. 16 | | 810 | 0.94 | 55 | 2.0 | 300 |
| Comp. Ex. 1 | Ti | 1925 | 1.94 | 55 | 0.005 | 300 |
| Comp. Ex. 2 | | 420 | 0.51 | 55 | 7.0 | 10 |
| Comp. Ex. 3 | | 250 | 0.22 | 55 | 2.0 | 700 |
| Comp. Ex. 4 | Pt | 240 | 0.22 | 55 | 1.0 | 250 |
| Comp. Ex. 5 | | 180 | 0.19 | 55 | 1.0 | 300 |
| Comp. Ex. 6 | | 150 | 0.16 | 55 | 2.0 | 500 |

Test Examples

Test Example 1

1. Transmission Electron Microscopy (TEM)

Observation was made using a transmission electron microscope to determine morphology of the porous carbon nanofiber before and after electroplating of the transition metal, and to measure particle diameter of the transition metal.

2. BET Specific Surface Area ($m^2 \cdot g^{-1}$)

Sample of the transition metal electroplated porous carbon nanofiber composite according to the present invention was pre-treated by degassing at 573 K for about 9 to 12 hours until the residual pressure inside the sample was below $10^{-3}$ torr. Specific surface area of the pre-treated sample (about 0.1 g) of the transition metal electroplated porous carbon nanofiber composite was determined by measuring adsorption of nitrogen gas at 77 K under liquid nitrogen atmosphere.

In the resultant nitrogen ($N_2$) isothermal adsorption curve, $P/P_o$ (P=partial pressure, $P_o$=saturation vapor pressure) can be obtained as the slope of the line, from about 0.05 to 0.3. BET specific surface area was calculated therefrom.

3. Content of Introduced Transition Metal (Weight %)

Transition metal content of the transition metal electroplated porous carbon nanofiber composite according to the present invention was measured by atomic absorption spectrophotometry (AAS).

4. Metal Dispersion Ratio (Area %)

Dispersion ratio of the transition metal introduced in the transition metal electroplated porous carbon nanofiber composite according to the present invention was calculated by dividing the active area determined by chemisorption with the external area of the porous carbon nanofiber composite.

5. Hydrogen Content (Weight %)

0.3 g of sample was taken from the transition metal electroplated porous carbon nanofiber composite according to the present invention. The sample was degassed at 573 K for 6 hours, while maintaining the residual pressure below $10^{-3}$ torr. Subsequently, hydrogen content was measured at 298 K and 100 atm, using BEL-HP (BEL High Pressure, BEL Japan). Hydrogen content was measured by the step-by-step method.

The result is given in Table 2 below.

TABLE 2

| | Transition metal | Electroplating | | Particle diameter (nm) | Transition metal content (weight %) | Metal dispersion ratio (area %) | Hydrogen content (weight %) |
| | | Electrical current density (A/m$^2$) | Time (sec) | | | | |
|---|---|---|---|---|---|---|---|
| Ex. 1 | Pt | 0.05 | 60 | 1.5 | 1.3 | 5.2 | 0.52 |
| Ex. 2 | | 0.1 | 60 | 3.2 | 3.4 | 7.4 | 1.74 |
| Ex. 3 | | 0.5 | 60 | 5.2 | 5.5 | 9.2 | 2.42 |
| Ex. 4 | | 1.0 | 60 | 8.7 | 7.5 | 7.5 | 2.13 |
| Ex. 5 | Cu | 0.1 | 30 | 2.9 | 2.1 | 3.5 | 0.41 |
| Ex. 6 | | 0.5 | 30 | 10.2 | 7.2 | 4.2 | 1.51 |
| Ex. 7 | | 2.5 | 15 | 15.4 | 9.4 | 3.5 | 1.20 |
| Ex. 8 | | 5.0 | 20 | 18.7 | 11.2 | 3.3 | 1.05 |
| Ex. 9 | Ni | 0.05 | 60 | 3.8 | 1.5 | 3.9 | 0.44 |
| Ex. 10 | | 0.1 | 60 | 4.7 | 3.1 | 5.8 | 1.21 |
| Ex. 11 | | 0.5 | 60 | 5.3 | 5.4 | 8.5 | 1.68 |
| Ex. 12 | | 3.0 | 60 | 9.2 | 8.2 | 7.2 | 1.51 |
| Ex. 13 | Ag | 0.05 | 30 | 5.2 | 2.3 | 1.2 | 0.27 |
| Ex. 14 | | 0.01 | 60 | 7.5 | 4.2 | 2.5 | 0.35 |
| Ex. 15 | | 5.0 | 10 | 12.4 | 6.5 | 3.2 | 0.42 |
| Ex. 16 | | 2.0 | 300 | 14.2 | 7.9 | 3.0 | 0.38 |
| Comp. Ex. 1 | Ti | 0.005 | 300 | 0.9 | 0.005 | Immeasurable (too little electroplating) | 0.05 |
| Comp. Ex. 2 | | 7.0 | 10 | 2.7 µm | 25 | Immeasurable (too large particle diameter) | 0.01 |
| Comp. Ex. 3 | | 2.0 | 700 | 120 | 18 | Immeasurable (clustering) | 0.02 |
| Comp. Ex. 4 | Pt | 1.0 | 250 | 14.1 | 15.5 | 55 | 0.007 |
| Comp. Ex. 5 | | 1.0 | 300 | 16.7 | 13.5 | 60 | 0.006 |
| Comp. Ex. 6 | | 2.0 | 500 | 65.2 | 20.2 | Immeasurable (clustering) | 0.01 |

As shown in Table 2, the present invention (Examples 1 to 16) exhibited adequate specific surface and transition metal particles with particle size from 1 to 20 nm were dispersed well with dispersion ratio of from 1 to 10 area %, as compared with Comparative Examples 1 to 6. Consequently, hydrogen storage capacity was improved.

Test Example 2

A unit cell was prepared using the transition metal electroplated porous carbon nanofiber composite prepared in Example 1 as electrode active material for a supercapcitor. Capacitance was measured using 4 M KOH as electrolyte. Whereas an active carbon electrode showed the capacitance of about 50 F/g, the electrode prepared using the composite prepared in Example 1 showed a capacitance as high as 80 F/g. Consequently, it was confirmed that the transition metal electroplated porous carbon nanofiber composite according to the present invention can be utilized as electrode material for a capacitor.

The preparation method of a transition metal electroplated porous carbon nanofiber composite for hydrogen storage according to the present invention enables precise control of transition metal content and dispersion ratio through control of electroplating conditions. As a result, a high-capacity transition metal electroplated porous carbon nanofiber composite for hydrogen storage with optimized content, dispersion ratio and specific surface area can be attained. Further, the transition metal electroplated porous carbon nanofiber composite for hydrogen storage prepared by the preparation method can be utilized as active material for electrodes of electrochemical devices.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparation of a transition metal electroplated porous carbon nanofiber composite comprising:
    providing an anode comprising a transition metal plate and a cathode comprising a porous carbon nanofiber with specific surface area from 500 to 3000 m$^2$/g, pore volume from 0.1 to 2.0 cc/g and diameter from 10 to 500 nm supported on a conductive support in an electroplating bath; and applying an electrical current of 0.01 to 5.0 A/m² between the anode and the cathode for 15 to 300 seconds;

wherein the transition metal electroplated porous carbon nanofiber composite has a hydrogen storage capacity in the range of from 0.01 to 3 weight %, and a transition metal dispersion ratio, relative to the external specific surface area of the support, in the range of from 0.01 to 50 area %.

2. The method according to claim 1, wherein the transition metal is at least one selected from platinum (Pt), copper (Cu), nickel (Ni), silver (Ag), chromium (Cr), aluminum (Al), iron (Fe), cobalt (Co), ruthenium (Ru) and zinc (Zn).

3. The method according to claim 1, wherein the transition metal is electroplated in an amount of from 0.01 to 30 weight %, based on the total weight of the porous carbon nanofiber.

4. The method according to claim 1, wherein the transition metal of the transition metal electroplated porous carbon nanofiber composite has a particle size ranging from 1.5 to 20 nm.

* * * * *